(12) United States Patent
Billig et al.

(10) Patent No.: US 6,533,843 B2
(45) Date of Patent: Mar. 18, 2003

(54) TWO STAGE FLASH FOR HYDROCARBON REMOVAL

(75) Inventors: Barry Billig, Irvington, NY (US); Chun Chan, Brooklyn, NY (US)

(73) Assignee: Scientific Design Company, Inc., Little Ferry, NJ (US)

(*) Notice: Subject to any disclaimer, the term of this patent is extended or adjusted under 35 U.S.C. 154(b) by 0 days.

(21) Appl. No.: 09/874,732

(22) Filed: Jun. 5, 2001

(65) Prior Publication Data
US 2002/0178916 A1 Dec. 5, 2002

(51) Int. Cl.[7] ................................................ B01D 53/14
(52) U.S. Cl. ............................ 95/172; 95/174; 95/192; 95/203; 95/237
(58) Field of Search ...................... 95/160, 161, 162, 95/163, 165, 166, 167, 168, 169, 172, 173, 174, 176, 177, 191, 192, 203, 208, 207, 204, 237

(56) References Cited

U.S. PATENT DOCUMENTS

| | | | | |
|---|---|---|---|---|
| 3,165,539 A | * | 1/1965 | Lutz | |
| 3,729,899 A | * | 5/1973 | Cunningham et al. | |
| 3,867,113 A | * | 2/1975 | Foster et al. | |
| 4,469,492 A | * | 9/1984 | Lagana et al. | |
| 4,529,417 A | * | 7/1985 | Lagana et al. | |
| 4,778,567 A | * | 10/1988 | Kakimoto et al. | |
| 4,875,909 A | * | 10/1989 | Kakimoto et al. | |

* cited by examiner

Primary Examiner—Duane S. Smith
(74) Attorney, Agent, or Firm—William C. Long

(57) ABSTRACT

Scrubber liquid from an ethylene oxide process rich in bicarbonate and dissolved ethylene is flashed in two stages to separate ethylene containing vapor from bicarbonate rich solution reduced in ethylene content.

2 Claims, 1 Drawing Sheet

TWO STAGE FLASH FOR HYDROCARBON REMOVAL

BACKGROUND OF THE INVENTION

1. Field of the Invention

The present invention relates to a two stage flash process for the effective removal of hydrocarbons in an ethylene oxide process carbon dioxide removal system whereby the amount of flash gas required to remove a certain amount of hydrocarbon in a carbonate removal system is substantially reduced as compared to conventional practices.

2. Description of the Prior Art

In processes such as those where ethylene oxide is formed by the oxidation of ethylene with molecular oxygen, carbon dioxide is also produced during the oxidation and it is necessary that the carbon dioxide be separated in order to prevent a build up of this product.

In commercial ethylene oxide processes the carbon dioxide removal is frequently accomplished by a hot carbonate system such as is described, for example, in U.S. Pat. Nos. 3,823,222 and 4,160,810. All or a portion of the reaction gas from the ethylene oxide reactor after ethylene oxide removal, which is rich in unreacted ethylene, is contacted with a solution of potassium carbonate and potassium bicarbonate whereby the carbonate reacts with the carbon dioxide in the reaction gas and is converted to the bicarbonate. The resulting solution rich in bicarbonate is regenerated by steam stripping to release the carbon dioxide and convert the bicarbonate back to carbonate for further use in the process.

The reaction gas contains a substantial concentration of unreacted ethylene, and in the process of absorbing the carbon dioxide a certain amount of this unreacted ethylene is dissolved in the absorbent solution. When the solution is directly steam stripped to release the carbon dioxide, the dissolved ethylene contained therein is released to the atmosphere with the stripped carbon dioxide. The release of ethylene is disadvantageous in that the permissible amount of ethylene released to the atmosphere is limited by local atmospheric pollution regulations. Also the ethylene has a value as a feed stock. Therefore, it is required and desirable to remove dissolved ethylene from the absorber solution and recover this ethylene.

In normal practice, a single stage flash is employed to flash the absorber solution with the flashed vapor passing to a recovery compressor in order to recover ethylene for recycle to the process.

The regulations on ethylene emissions often specify a fixed quantity of ethylene which can be released to the atmosphere independent of plant size. As the plant size increases it is, therefore, often the case that the percent removal required for the ethylene significantly increases with increased plant size, to maintain the absolute emission limit. As the percent removal increases, the amount of flash gas required per unit of ethylene increases and the amount of recycle carbon dioxide also increases.

For large plants the amount of recycle carbon dioxide in a single stage flash system can exceed 20% of the normal carbon dioxide removal requirement and the recovery compressor size can become disproportionately large compared to a smaller plant. In accordance with the present invention, the use of a two stage flash system can significantly reduce this problem, thus reducing the cost of the carbon dioxide removal system and also the cost and energy consumption of the recovery compressor.

SUMMARY OF THE INVENTION

In accordance with the present invention, the enriched absorber solution from hot carbonate scrubbing of ethylene oxide reaction gas, after the ethylene oxide removal, which enriched solution is high in bicarbonate and which contains dissolved ethylene, is passed from the absorber to a first flash zone wherein the bulk of the dissolved ethylene, oxygen, and other gases are removed from the liquid by flashing into the gas phase. The liquid from the first flash zone is sent to a second flash zone wherein conditions of the flashing are controlled to insure that such ethylene as remains in the liquid from the second flash after flashing carbon dioxide and ethylene will meet the appropriate emission regulations when the liquid is steam stripped to release carbon dioxide.

BRIEF DESCRIPTION OF THE DRAWING

The attached drawing is a schematic representation of a practice of the invention.

DETAILED DESCRIPTION

Figure 1:
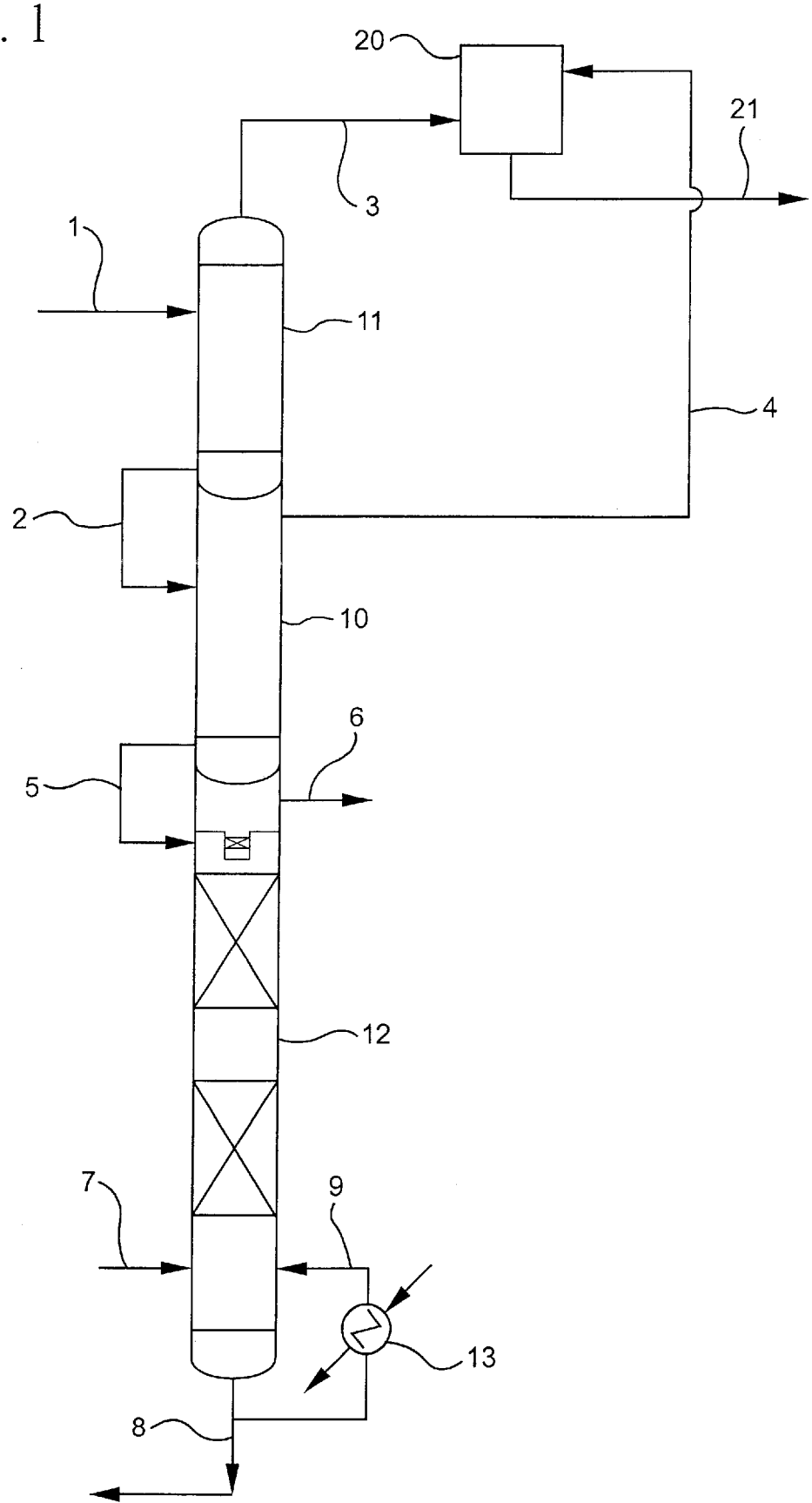

Not shown in the drawing is the conventional production of ethylene oxide by molecular oxygen oxidation of ethylene, the conventional water scrubbing of product ethylene oxide, or the conventional scrubbing of the resulting reaction gas with hot carbonate to separate carbon dioxide therefrom. These are conventional and well known procedures which are widely practiced commercially.

Referring to the drawing, the hot carbonate absorber liquid from the absorber which is rich in bicarbonate and contains dissolved ethylene and oxygen, is passed from the carbon dioxide absorption (not shown) to the first stage flash zone or drum 11 and introduced therein via line 1. This absorber liquid is generally at a temperature of about 85° C. to 110° C. In the first stage flash zone, conditions are suitably maintained at an intermediate pressure between the pressure in the absorber which generally is about 18.5 kg/cm$^2$ absolute to 23.0 kg/cm$^2$ absolute and atmospheric pressure to provide for flashing into the vapor phase of the bulk of the dissolved oxygen and ethylene and other dissolved gases. An illustrative pressure range in the first stage flash is 2.5–4.5 kg/cm$^2$ absolute. The flash vapor from the first stage zone is removed by means of line 3 and passes to the second stage of conventional recovery compressor 20. It is advantageous to have the pressure of the first stage flash vapor match the second stage pressure of the recovery compressor but this is not a requirement. Although the bulk of dissolved ethylene is removed at this point, i.e. at least 80%, and preferably at least 85%, the removal is not controlled in the first stage flash to meet emissions regulations. The liquid from the first stage flash zone 11 passes via line 2 to a second stage flash zone 10. In the second stage flash zone 10 the pressure and the flashed vapor rate is controlled to ensure that ethylene remaining dissolved in the liquid from the second flash zone after vapor separation will meet the required regulations when subsequently steam stripped from the liquid during carbon dioxide release. Illustrative pressures for the second stage flash are 1.5–2.5 kg/cm$^2$ absolute.

The flashed vapor from zone 10 is removed via line 4 and is preferably passed to the first stage of the recovery compressor 20 for recovery of ethylene in this flash as well as the ethylene in the vapor flashed from the first zone. In compressor 20 the flash vapors are compressed to reactor pressure and recycled to the ethylene oxide reactor (not shown) via line 21.

The liquid from the second stage flash zone 10 passes via line 5 to regenerator 12 where carbon dioxide along with dissolved ethylene which remains is stripped from the liquid by conventional means with a combination of live steam introduced via line 7 and reboiler steam from reboiler 13 which is introduced via line 9. The liquid from the regenerator which is now lean in bicarbonate and rich in carbonate is returned to the absorber via line 8 for further use in the overall process. The carbon dioxide along with water vapor and any residual ethylene is vented from regenerator 12 to the atmosphere via line 6. The amount of ethylene vented in this vent stream is maintained at a level so as to comply with the appropriate regulations, usually less that 5.0 kg/hr, and frequently less than 3.0 kg/hr.

In order to achieve best results, the operating conditions for the two flash stages be optimized. In the optimization, first and foremost the ethylene content of the liquid from the second stage flash must be low enough to meet environmental regulations. At the same time, the liquid from the second stage flash must contain the net carbon dioxide formed in the ethylene oxide reaction in order to avoid carbon dioxide build up.

EXAMPLE

Rich solution from the absorber at a temperature of about 91° C. and a pressure of about 22.8 kg/cm$^2$ absolute and containing 97 kg/hr of ethylene passes at a rate of 21,700 kg-mol/hr via line 1 to zone 11 and is flashed to a pressure of 3.15 kg/cm2 absolute, in the first stage flash zone 11. A flash gas of 349 kg/hr containing 83.1 kg/hr of ethylene and 180 kg/hr of $CO_2$ is send via line 3 to the recovery compressor 20. The liquid from the first stage flash still contains 13.9 kg/hr ethylene which exceeds the emission limit of 2 kg/hr. This liquid, at a temperature of 91° C., is sent via line 2 to the second stage flash zone 10 which operates at a pressure of 2.02 kg/cm2 absolute. The flashed gas from the second stage is removed at the rate of 120 kg/hr and contains 12.0 kg/hr of ethylene as well as 174 kg/hr of $CO_2$. This flash gas is sent via line 4 to the recovery compressor 20. The liquid from the second stage flash contains residual ethylene of 1.9 kg/hr, a level which meets the target emissions requirement. This liquid is sent to the regenerator where the net carbon dioxide of 10,300 kg/hr from the ethylene oxide reaction system is removed and vented to the atmosphere along with the 1.9 kg/hr ethylene. The two stage flash procedure of the invention removes a total of 95.1 kg/hr of ethylene (98.0%) and recycled 354 kg/hr of $CO_2$ or about 3.4% of the net $CO_2$ production. The flow to the recovery compressor system is 589 kg/hr for the combined first and second stage flash zones.

By way of comparison, if the ethylene removal was done in a single stage flash it would be required to flash 1782 kg/hr, at a flash pressure of 1.96 kg/cm$^2$, to meet the same ethylene emission level as is accomplished by the two stage flash. The increased capacity required of the recovery compressor from the single flash system is 3 times that of the two stage flash system. The recycled $CO_2$ is 1230 kg/hr which is a 12% increase on the $CO_2$ removal absorber.

The example above is for a 160,000 MT/YR ethylene oxide plant; as the plant size increases the difference between the two systems is magnified as it becomes increasingly difficult to maintain a fixed pounds per hour of ethylene in the off gas to the atmosphere.

We claim:

1. In a process for the production of ethylene oxide wherein
    a) ethylene is reacted with molecular oxygen to form a reaction gas mixture Comprised of ethylene oxide, carbon dioxide and unreacted ethylene,
    b) the reaction gas mixture of step a) is scrubbed with water and a solution comprised of ethylene oxide absorbed in water is separated from a gas mixture comprised of carbon dioxide and unreacted ethylene,
    c) the gas mixture comprised of carbon dioxide and unreacted ethylene from step b) is scrubbed with potassium carbonate scrubbing solution and a potassium carbonate scrubbing solution enriched in bicarbonate and containing dissolved ethylene is recovered, the improvement which comprises
        1) flashing the potassium carbonate scrubbing solution enriched in bicarbonate and containing dissolved ethylene,
        2) separating flashed vapor containing the bulk of the dissolved ethylene from liquid containing the bicarbonate,
        3) flashing the liquid from step 2 and separating vapor containing ethylene from liquid containing the bicarbonate,
        4) and recovering liquid flash bottoms from step 3 containing an amount of dissolved ethylene low enough to meet environmental discharge requirements.

2. The process of claim 1 wherein the vapors flashed from both the first and second flash step are passed to a recovery compressor for recycle.

* * * * *